Aug. 9, 1955    M. W. STROEHMAN    2,714,996
MOBILE ROLL STAND
Filed Aug. 21, 1950    7 Sheets-Sheet 6

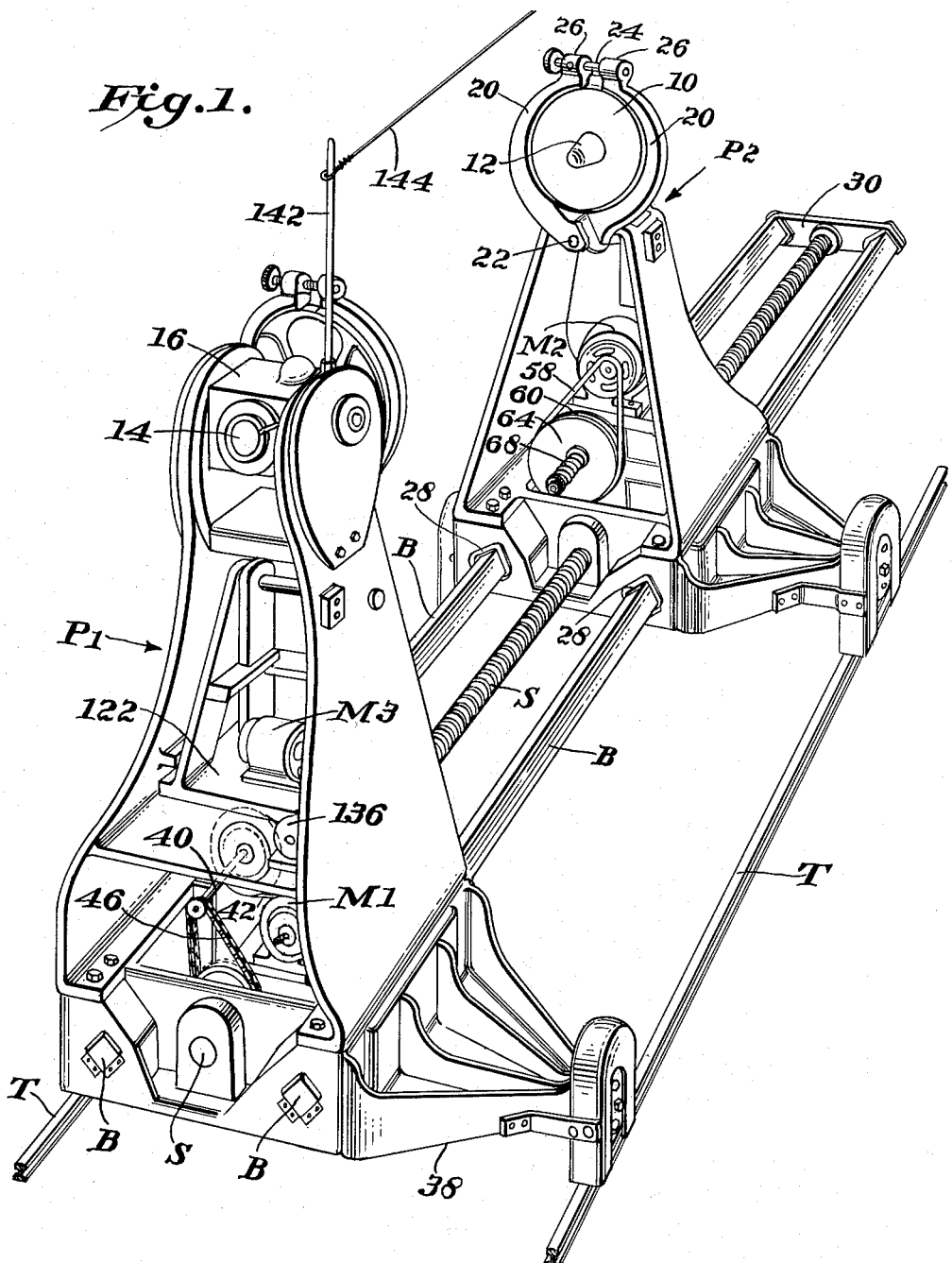

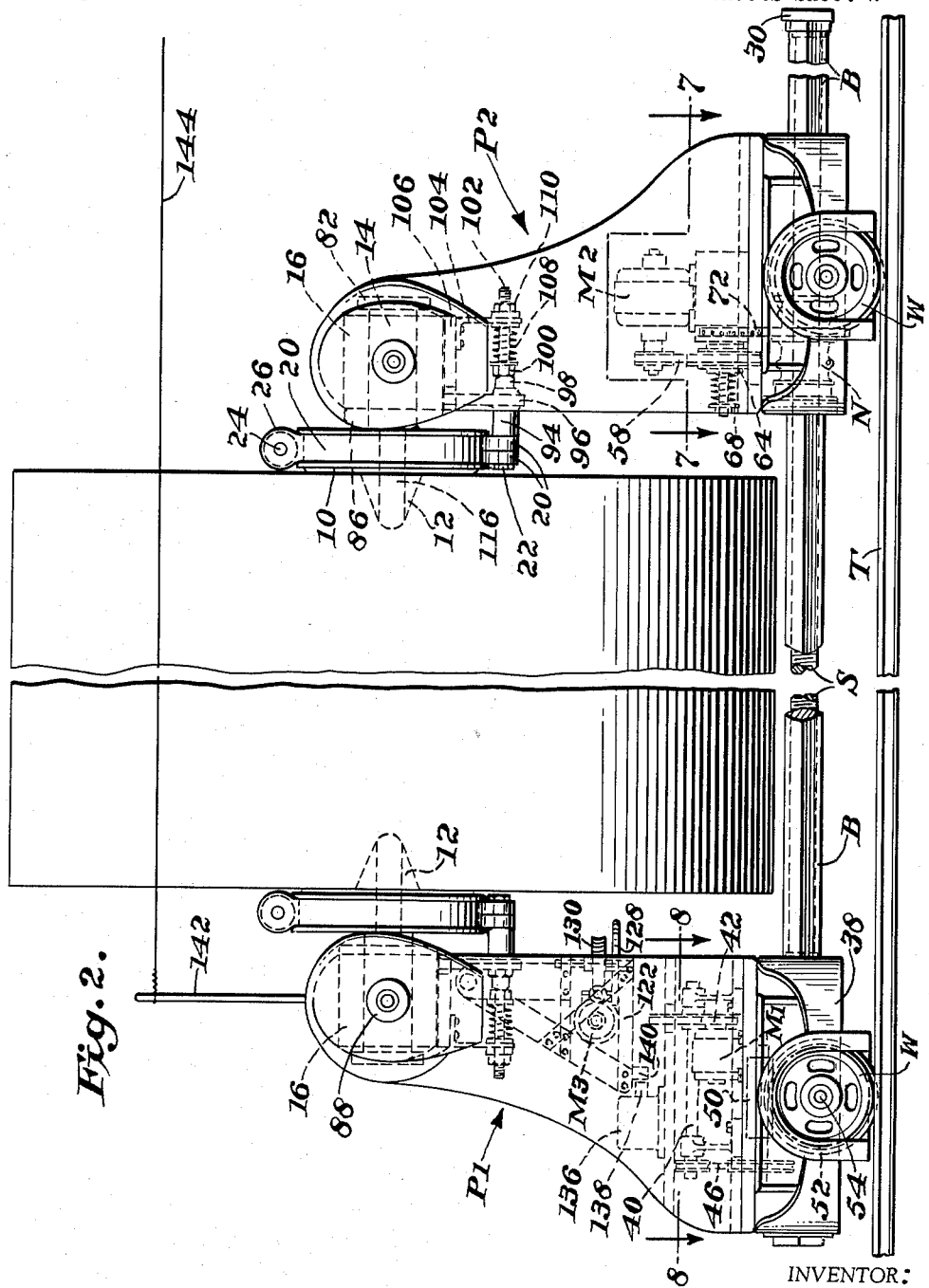

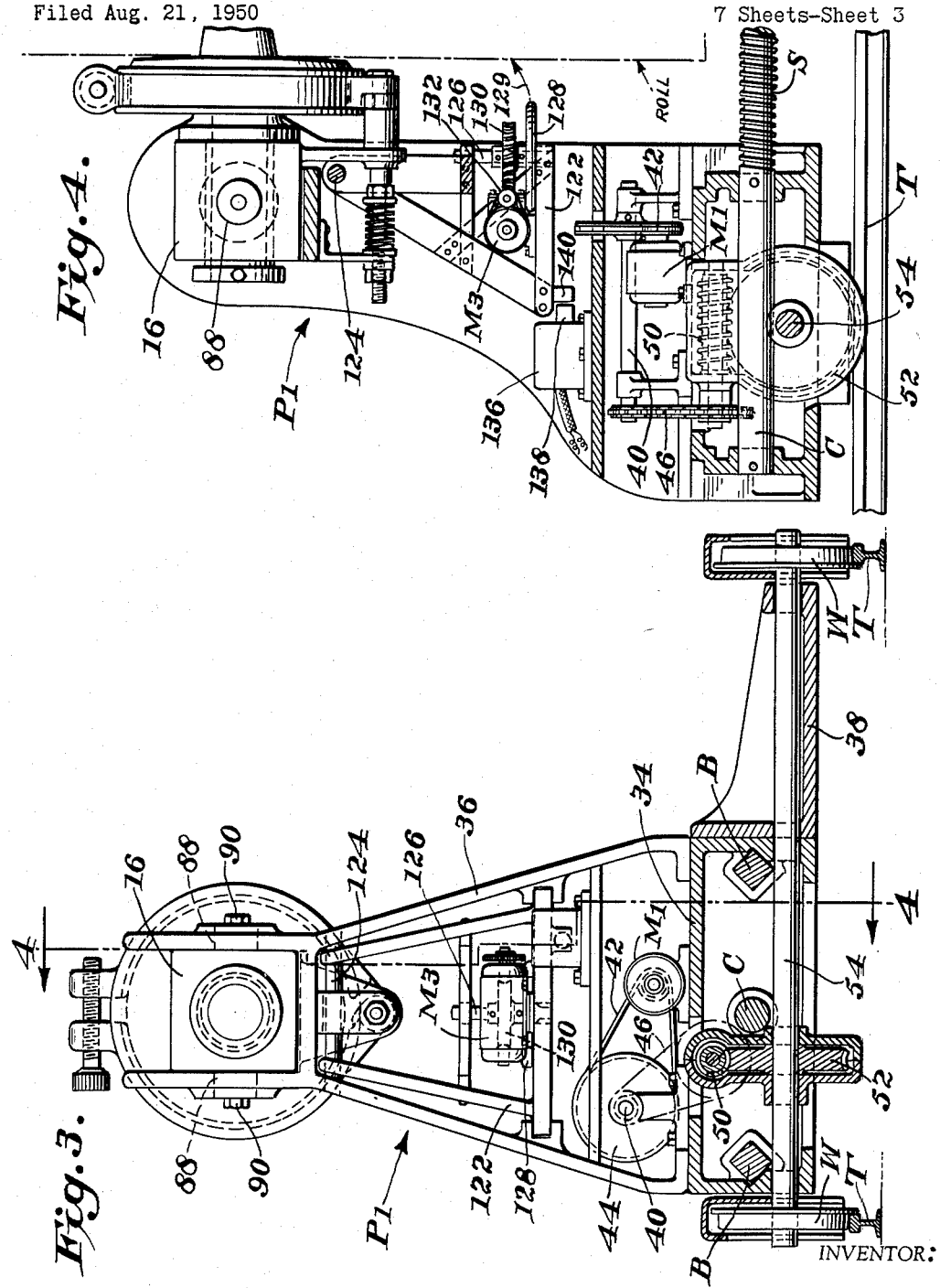

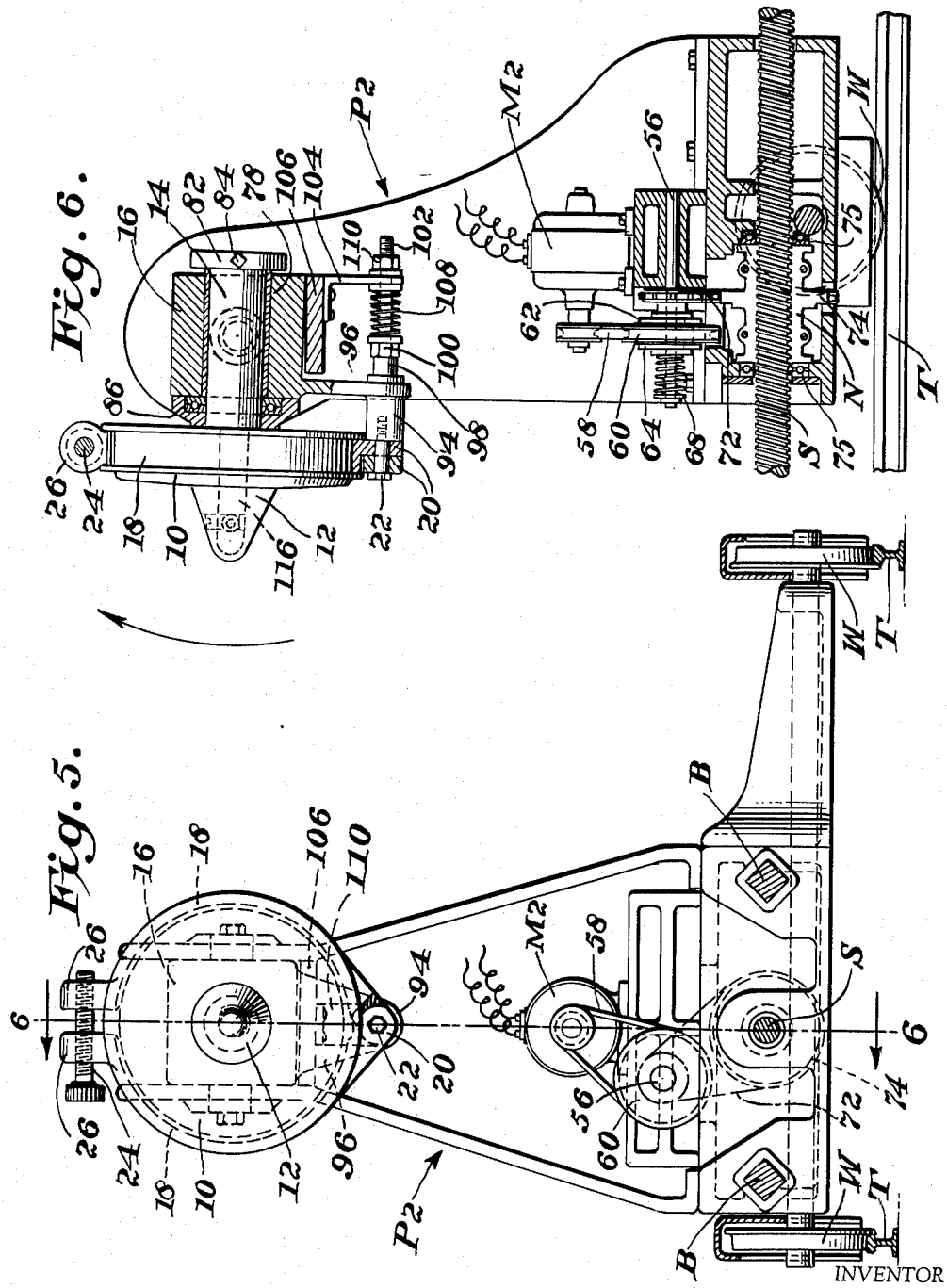

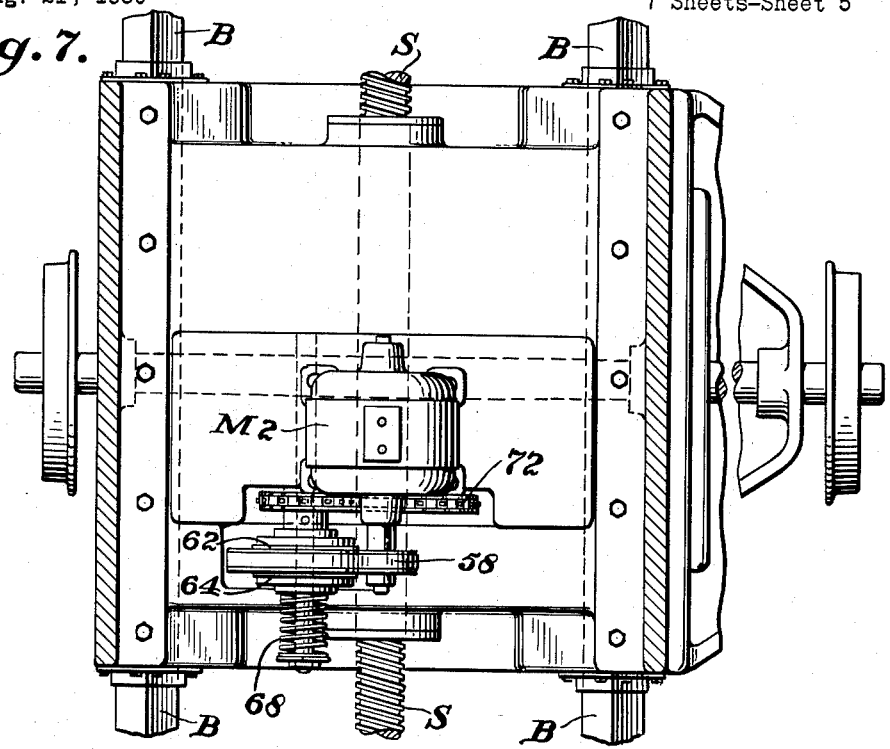
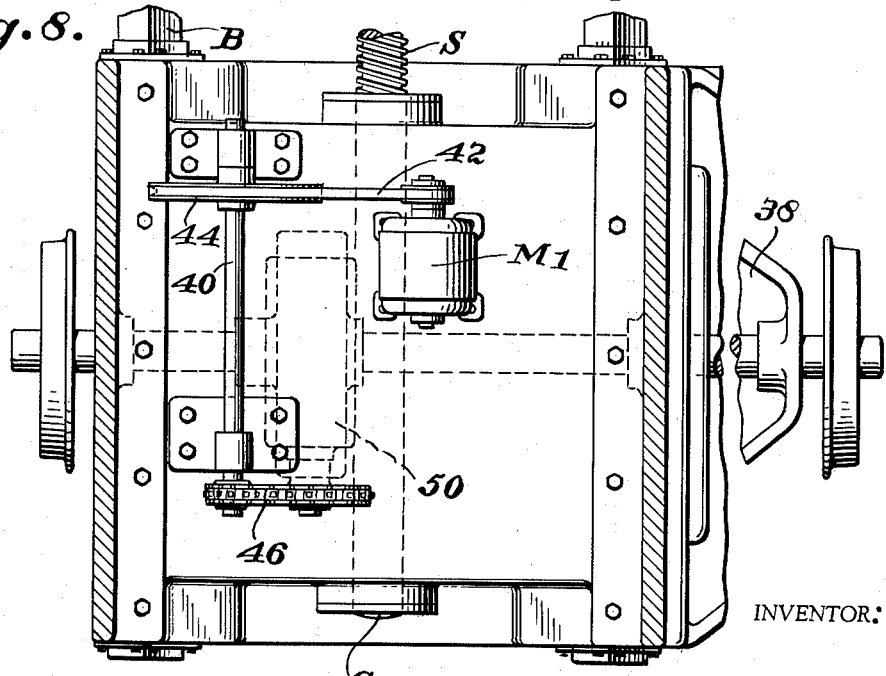

INVENTOR:
Milton W. Stroehman,
BY Cushman, Darby & Cushman
ATTORNEYS.

Aug. 9, 1955    M. W. STROEHMAN    2,714,996
MOBILE ROLL STAND
Filed Aug. 21, 1950    7 Sheets-Sheet 7
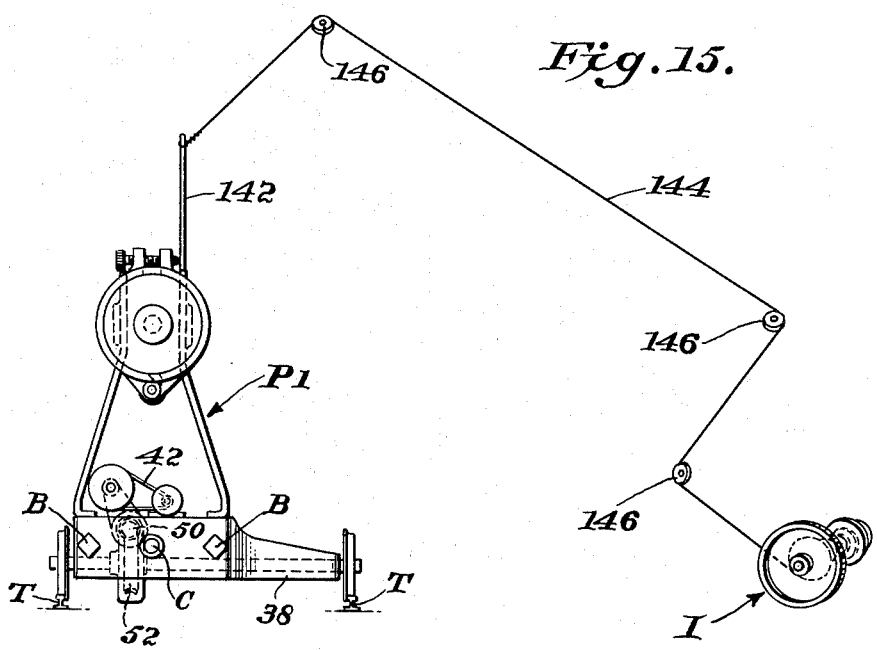
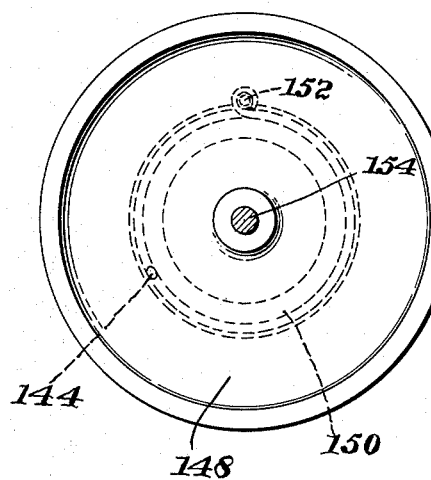
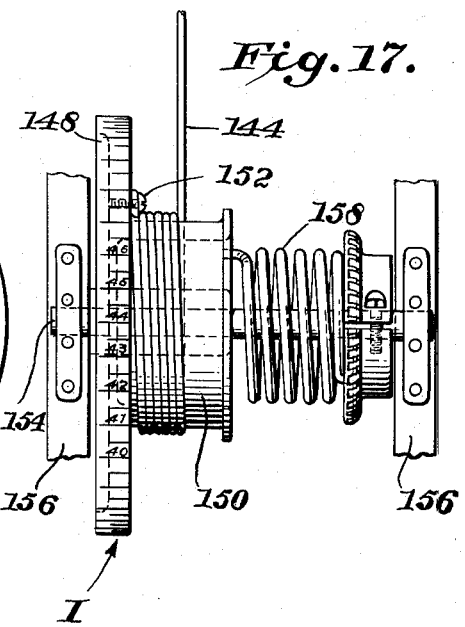
INVENTOR:
Milton W. Stroehman,
BY Cushman, Darby & Cushman
ATTORNEYS.

United States Patent Office 2,714,996
Patented Aug. 9, 1955

2,714,996

MOBILE ROLL STAND

Milton W. Stroehman, Parkersburg, W. Va., assignor to Kootz & Stroehman Machine Co., Parkersburg, W. Va., a corporation of West Virginia Application August 21, 1950, Serial No. 180,643

10 Claims. (Cl. 242—58)

The present invention relates to roll stands, for supporting and controlling the position and feeding of heavy rolls of paper as used, for instance, in the manufacture of corrugated paper for corrugated boxes and the like. It will be understood, of course, that the invention may be used to support and control the feed of other materials for analogous purposes.

The roll stand described, with other like stands, is adapted to be positioned in what may be termed a forming line, wherein the paper is drawn from the roll and continuously processed by other mechanical agencies in the line, to properly cut, press and adhesively secure the paper to materials taken from other rolls or sources in the line, in order to deliver from the line, completed corrugated paper or the like. It will also be understood by those skilled in the art, that an important consideration is to accurately maintain the feed roll in proper position in the line, and to accurately feed the paper therefrom, and it will also be understood that the problem of properly placing and maintaining the roll in the line is a serious one, for such rolls of paper may be five feet in diameter, and weigh six thousand pounds or more.

A principal object of the invention is to provide a self-powered mobile sheet roll stand which can be loaded with a fresh roll of paper at any central loading point, or in a loading aisle adjacent to or remote from the forming line, or even at the roll stock room or adjacent to the door leading therefrom, and then self-propelled on tracks into proper position in the forming line. Ancillary to the objective just mentioned, it is a purpose of the invention to provide such a mobile sheet roll stand which can be automatically adjusted in the forming line, by control from a remote point, to insure that the paper delivered from the roll is maintained in constant and proper alignment with paper and the like delivered by other rolls in the line, and with the various mechanical agencies in the line which operate on the paper to form it, as into a composite corrugated sheet.

The roll stand of the present invention may be loaded from the conventional power trucks equipped with hoists to deliver the roll at a desired point at any height, and thereafter the roll stand itself moves the roll to the proper position in the forming line. The use of special conveying means, to carry the unmounted roll into the forming line, is thus eliminated. The number of roll handling operations is reduced, and time and manpower is saved. The necessity for lift mechanisms operating in or adjacent to the forming line is avoided, and is unnecessary to provide expensive lift mechanisms built into the roll stand.

In general, the invention comprises a mobile sheet roll stand comprising a pair of pedestals each of which is equipped with wheels which roll on a track leading from a convenient loading point into the forming line. By means of a source of power carried on the roll stand, the stand can be moved as a unit along the track into and from the forming line, and by means of suitable power carried by the stand itself, one pedestal may be moved on the track, from and toward the other pedestal, incident to receiving and supporting a roll which is gripped between the pedestals. In the preferred construction, electric motors mounted on the roll stand, are employed for the purposes stated above, and by suitable electrical connections, movement of the stand as a unit and the relative movements of th pedestals which comprise the stand, may be locally or remotely controlled.

The rolls are rotatably carried by suitable core plugs journalled in bearing blocks at the top of the pedestals, the bearing blocks being pivotally carried by trunnions in the upper ends of the pedestals, providing limited rocking movement of the core plugs toward the roll whereby the core plugs are self-aligning when a roll is gripped between the pedestals. This feature of self-alignment eliminates fracture of the core plugs or adjacent roll supporting means, a casualty frequently encountered in the use of the present day installations.

A most simplified mechanical arrangement is provided for connecting the separate pedestals of the stand for movement from and toward one another, comprising a lead screw and supporting bars extending longitudinally from one pedestal and fixed thereto, the screw and bars passing through the other pedestal which is arranged for relative movement along the screw and bars. The second pedestal thus referred to, is provided with a heavy nut which engages and moves the pedestal along the screw, driven by a motor on this second pedestal. Each pedestal carries suitable brake drums to selectively apply the desired amount of restraining influence against rotation of the roll, at opposite ends thereof.

In addition to the objectives previously referred to, and those which will be apparent as the description herein progresses, the invention provides means on the roll stand for initiating the turning movement of the roll to start the feed of paper into the forming line, as well as indicating means operated by the movement of the stand, whereby proper alignment of the paper delivered through the forming line, is maintained.

Fig. 1 is a perspective view of the mobile sheet roll stand of this invention, showing the same mounted on tracks.

Fig. 2 is a side elevational view of the mobile sheet roll stand.

Fig. 3 is an outside end elevational view of the first or fixed pedestal of the stand, partly in section, in order to show how the stand is driven as a unit from an electric motor carried on this pedestal.

Fig. 4 is a transverse vertical sectional view taken along the line 4—4 of Fig. 3.

Fig. 5 is an inside elevational view of the second or movable pedestal.

Fig. 6 is a transverse vertical sectional view taken along the line 6—6 of Fig. 5.

Figs. 7 and 8 are horizontal sectional views taken respectively along the lines 7—7 and 8—8 of Fig. 2.

Figure 9:
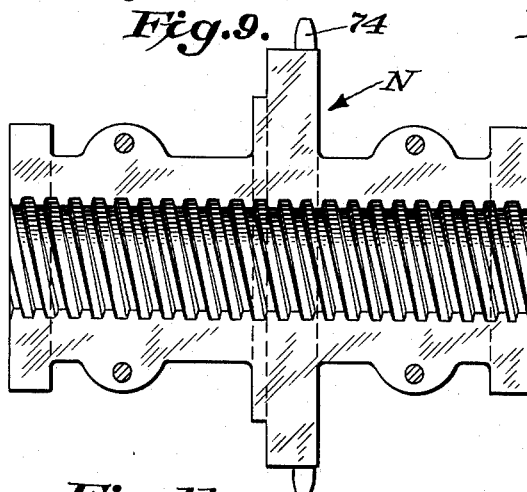

Fig. 9 is an inside view of one of the halves which make up the driving nut for moving the second pedestal along the lead screw.

Figure 10:
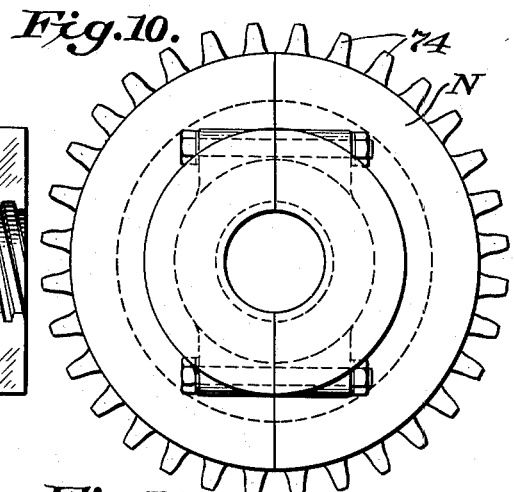

Fig. 10 is an end view of the driving nut, with the two halves thereof assembled.

Figure 11:
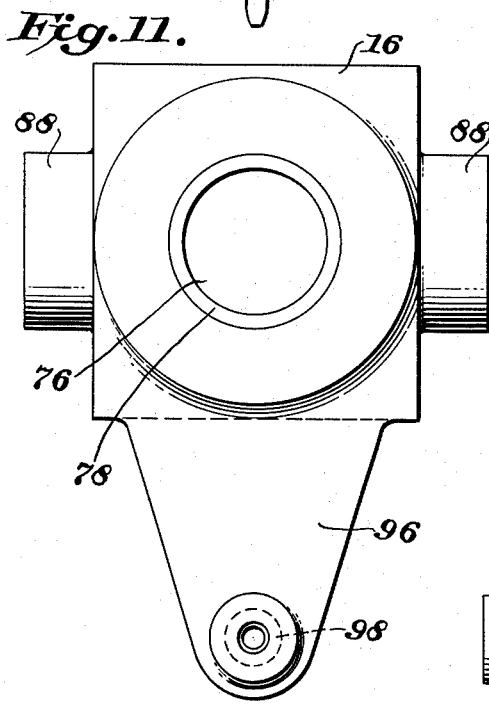

Fig. 11 is an inside elevational view of one of the bearing blocks which carries the core plug.

Figure 12:
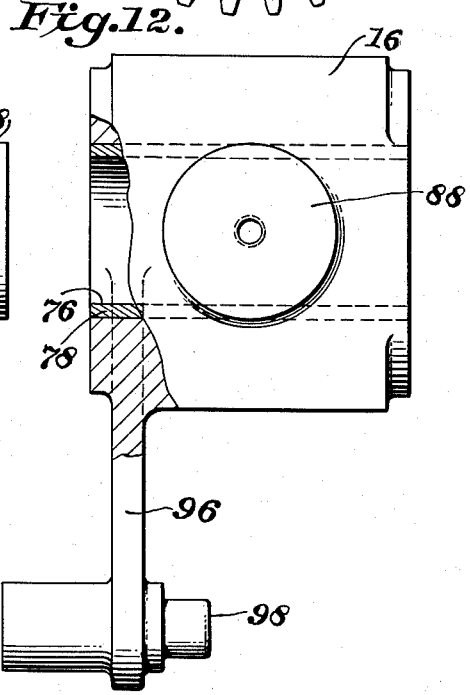

Fig. 12 is a side elevational view of the bearing block of Fig. 11, partially in section.

Figure 13:
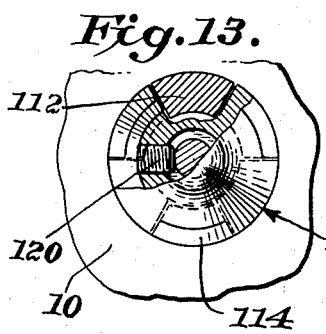

Fig. 13 is an end view of one of the core plugs, partially in section showing the manner of mounting the same.

Figure 14:
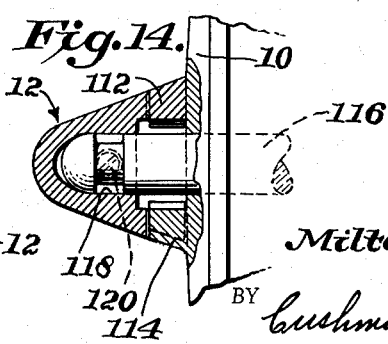

Fig. 14 is a vertical sectional view through one of the core plugs.

Fig. 15 is a diagrammatic view showing the arrangement of the indicating mechanism which records the position of the roll stand in the forming line.

Fig. 16 is an end view of an indicator which may be used in the arrangement illustrated in Fig. 15, and Fig. 17 is a side elevational view of the indicator of Fig. 16.

Referring to Fig. 1, the mobile sheet roll stand is shown as comprising a first or fixed pedestal P¹ and a second or movable pedestal P², the pedestals being independent of one another except for an adjustable connection hereinafter described, and each being provided with pairs of wheels, suitably covered for protection, whereby the pedestals are capable of movement along the track T. As has been indicated, the stand may move as a unit along the track, or the pedestal P² may move a limited extent along the track, relative to the pedestal P¹, for purposes of adjustment and gripping of the roll. As is apparent in Figs. 1, 2, 3, 4, 5, and 6, the pedestal structures are generally identical which is a manufacturing advantage, and their upright portions are offset laterally of the center line of the roll stand, and away from the direction of travel of the sheet through the forming line, in order to resist any tendency to upset the stand as the sheet is pulled from the roll, by the mechanisms in the forming line.

At the top of each pedestal there is a chuck comprising a disc 10 and a conical core plug 12 centrally and removably secured thereto, the core plug being inwardly presented from its disc to enter the opening in the roll. Suitable connecting means on the disc and core plug are provided, whereby core plugs of different sizes may be attached, to accommodate the different sizes of rolls. The disc 10 is fixed to a core plug shaft 14, which is journalled for rotation in a bearing block 16, the latter being in turn pivotally carried for limited rocking movement between the side plates of the pedestal, at the top thereof, whereby the core plugs are self-aligning, with respect to the roll, when the pedestals are drawn together to firmly grip the roll between them. Because of the size and weight of the roll, extreme pressure must be applied in drawing the pedestals toward one another to grip the roll, and this may cause some bending of the upper ends of the pedestals outwardly from the true vertical. In machines previously known in the art, no provision was made to compensate for this bending, whereby the parts were under stress during the unwinding of the roll, and fractures of the core plugs and associated parts were frequent.

As best shown in Fig. 6, the periphery of the chuck disc is provided with spaced flanges defining a circular peripheral surface 18 constituting a brake shoe, and brake bands 20 are provided, and pivoted as at 22 to the bearing block 16, the upper ends of the brake shoes being connected by a screw 24 threaded in collars 26 on the brake shoes, whereby tension may be selectively applied at opposite ends of the stand, to control the turning movement of the roll in response to the pulling tension applied to the paper by the mechanisms in the forming line.

Extending inwardly from the pedestal P¹, and rigidly connected thereto, is a lead screw S and guide bars B disposed on opposite sides thereof, and the pedestal P² is adjustably mounted on the bars and on the screw, the bars passing through babbitt-lined bearing openings 28, and the lead screw passing through a rotatable drive nut carried within the lower part of the pedestal P², as hereinafter described.

The remote ends of the screw S and the bars B, beyond the pedestal P², are rigidly connected and supported to one another by a bracket 30.

The power assembly for driving the stand as a unit is carried in and by the pedestal P¹. The power assembly for moving the pedestal P² toward and from the pedestal P¹, is carried by and within the pedestal P².

The mechanism for driving the stand as a unit (carried by the pedestal P¹), is best shown in Figs. 3 and 8. The pedestal comprises rugged casting parts secured together as by welding, comprising a base frame 34, an upwardly extending frame 36, and a side frame 38. Mounted on the frame 34, is an electric motor M¹, which drives a shaft 40 journalled in brackets on the same frame, through a belt 42 and a pulley 44. On the opposite end of the shaft 40, there is a toothed wheel which drives a chain 46, the latter in turn engaging a toothed wheel having a shaft journalled in the frame, there being a worm 50 on this shaft, which drives a worm wheel 52 carried on an axle 54 which extends laterally of the lower frame of the pedestal, and carries wheels W on its opposite ends which move along the track T. Motor M¹ may be operated through any conventional electrical connections, and preferably by remote control from some central control point or tower in the plant, so that by closing a switch at this control point, the roll stand may be caused to move along the tracks, outwardly to a loading point, or inwardly to proper position in the forming line, when loaded with a roll. Of course, a number of the roll stands may be thus controlled from a single control point or tower, by any suitable and well known electrical means.

The power assembly for driving or adjusting the pedestal P² from and toward the pedestal P¹, is best shown in Figs. 5, 6 and 7, it being understood that this pedestal is made up of rugged and rigidly connected frames, as described in connection with the other pedestal. Mounted in this pedestal is a motor M² which drives a shaft 56 by means of a belt 58, the belt being in driving engagement with a pulley 60 suitably constructed and mounted on the shaft 56 to provide a friction clutch. For instance, and referring to Fig. 6, the shaft 56 may have an inside pressure plate 62 fixed thereon, and a movable pressure applying plate 64 is arranged on an extension of the shaft 56, on the opposite side of the pulley 60, the pulley being capable of relative rotation around the shaft 56 except when sufficient pressure is applied against the side faces of the pulley, by the plate 64, which is held against the pulley by a considerable pressure exerted by a spring 68 mounted on an extension of the shaft 56, in such manner that applied tension may be adjusted.

The shaft 56 carries a toothed wheel or sprocket which meshes with a drive chain 72, the latter meshing with the teeth of a sprocket 74 and in turn carried by the drive nut N, which is interiorly threaded thereon and for movement around the lead screw S.

The nut N is held at its ends, between suitable plates of the lower frame, with suitable anti-friction thrust bearings 75 between the ends of the nut and these plates, as shown in Fig. 6, whereby upon operation of the motor M², the nut will be driven and when it turns within the frame of the pedestal, while being restrained against endwise movement therein, the pedestal will be caused to move inwardly and outwardly along the lead screw and the guide bars B, the pedestal being supported in these movements by its wheels W, riding along the track T.

It will be understood that the purpose of this movement is to enable the pedestal P² to move outwardly in order to position a roll between the chucks of the pedestal, and to then move pedestal P² inwardly to grip the roll between the chucks and to apply considerable force to the ends of the roll, when gripping same. These operations are performed under the control of the electrical motor M², which may have suitable electrical connections leading to switches and the like, located on the roll stand, preferably, or possibly at some more remote point. Of course, if the motor is operated to cause excessive turning of the nut N and consequent excessive inward movement of the pedestal P², the effect of the spring 68 of the friction clutch arrangement will be overcome, and thereafter, further operation of the motor will only turn the pulley 60 idling around the shaft 56, whereby any damage to the parts is avoided. It will be understood that the friction clutch arrangement generally described, may take various forms, and the particular arrangement referred to may be considered as illustrative of such devices which may be suitable and available on the market.

Referring to Figs. 6, 11 and 12, the bearing block 16 has a longitudinal bore 76 extending therethrough, which is lined with bearing sleeve 78, and the core shaft 14 is mounted for rotation in this bearing, being retained at the rear face of the bearing block by a collar 82 secured to the shaft by set screw 84, or in any other suitable way. The chuck disc 10 is fixed to a forward extension of the core shaft 14, and a fitting 86 of any suitable form may be rigidly connected with the shaft 14, and with the disc 10 on the rear face of the latter, this fitting being adapted to bear against the inner face of the bearing block 16, with suitable anti-friction bearings being positioned between the bearing block and the fitting 86, shown in Fig. 6.

The sides of the bearing block carry trunnions 88, which are rigidly secured to the bearing block, as by being bolted into cylindrical recesses in the side walls thereof, with bolts 90 as indicated in Fig. 3. Thus, the bearing blocks may be properly positioned between the side plates at the top of the frame 36 of the pedestal, the trunnions 88 being inserted through bearing openings in the upper plates of the frame 36, and thereafter rigidly secured to the bearing blocks by the bolts 90. After such an assembly, it will be understood that the bearing block is capable of rocking movement toward the roll, and with relation to the frame of the pedestal, the entire chuck including the disc 10 and core plugs 12 rocking with the bearing block 16.

Again, referring to Fig. 6, the brake shoes 20 are pivotally carried on a pin 22 which extends outwardly from an abutment 94 in turn carried by an arm 96 which depends from the bearing block 16. The arm 96 also carries an outwardly presented abutment or stop 98, which is adapted to engage a cooperating abutment in the form of a nut 100 carried on the inner end of a rod 102 which passes through an opening in a bracket 104 secured to a cross brace 106 rigidly carried by the frame of the pedestal. A spring 108 is mounted on the rod 102, between the abutment 100 and a washer on the inner face of the bracket 104. A nut 110 on the outer end of the rod 102 is adjusted to an extent so that the abutment 100 engages the abutment 98, to tilt the axis of the core shaft 14 upwardly to a slight angle when there is no roll carried between the chucks. When a roll is positioned between the chucks, the bearing block and its trunnion 76 tilt forwardly and downwardly, against the tension of the spring 108. When gripping pressure is applied to the chucks, by operation of the nut N and the pedestal P², any pulling of the pedestal frame out of vertical alignment will be compensated for by the permissible tilting of the bearing block 16, whereby the chucks are self-aligning with respect to the axis of the supported roll.

Referring to Figs. 13 and 14, the core plug 12 is shown as comprising a hollow conical member, rounded at its forward end, and provided at its open end with circularly spaced teeth 112 which enter between similar circularly spaced teeth 114 projecting forwardly from the chuck disc 10. The machine is provided with a number of cores 12 which vary in size, to receive the different sizes of the paper roll, but all of the core plugs have identical design and dimensions at the base, to connect with the chuck disc 10. The core is carried on an extension 116 of the core shaft 14, there being a groove 118 near the forward end of said extension, which receives a lock screw 120 which passes through the wall of the core to secure the latter on the extension and thus on the core shaft. The cooperating teeth 112 and 114 lock the core plug to the chuck disc, whereby the latter rotates with the core plug when the roll of paper is turned.

As stated above, the roll of paper is quite heavy, and it is customary when initially feeding the paper into the forming machine, to turn the roll by hand, until its inertia is overcome. In order to start the roll in its turning movement, I provide a starting mechanism on the pedestal P¹ as best shown in Figs. 3 and 4. This mechanism comprises a platform 122 pivoted on a rod 124 extending between the side plates of the frame, and between suitable brackets on this platform a vertical shaft 126 is journalled for rotation. This shaft carries a friction wheel 128 which is adapted to contact the end surface of the roll to impart turning movement to the roll, when the platform 122 is swung inwardly as indicated by the arrow 129 in Fig. 4. The shaft 126 is driven by means of its worm wheel 130, which engages a worm 132 driven by a motor M³ carried on the platform 122. A solenoid 136 is mounted on the pedestal, and the solenoid piston 138 is positioned to contact an abutment 140 depending from the platform 122, whereby when a suitable electrical control switch is closed, the solenoid piston 138 moves inwardly against the abutment 140, to tilt the platform around the pivot rod 124, whereby the friction wheel 128 will engage the end area of the roll, and the turning of the wheel 128 caused by its connection with the motor M³, will impart initial turning movement to the paper roll. When the roll is brought up to the speed of movement of the paper through the forming line, the electrical switch may be disengaged to deenergize the solenoid 136 and permit its piston 138 to move to the left as viewed in Fig. 4, whereby the platform will swing outwardly to remove the friction wheel 128 from contact with the roll. If desired, any suitable automatic mechanism may be employed to deactivate the roll turning mechanism just described, such as any suitable overrunning clutch which will permit the roll to turn freely after the machines in the forming line control the speed of rotation of the roll.

Because of the mobility of the roll stand of this invention, and its mounting upon a fixed track, it is possible to maintain the paper roll in exact alignment with the other agencies in the forming line, and to correct any misalignments which are noted, during the operation of the machines in the forming line. As stated, suitable electrical connections are provided whereby button switches may be pushed to cause the roll stands to move into the forming line, after the rolls have been mounted in the stands, and when a roll stand is properly positioned in the line and its drive motor M¹ is deenergized, the connection between the drive worm 50 and the worm wheel 52 on the shaft 54 of the pedestal P¹, is such as to provide a brake for retaining the roll stand in that exact position on the track, to which it has been moved.

Of course, the distance which a roll stand must move from a given loading point inwardly to proper alignment in the forming line, may vary, depending on the length of the roll which it carries. I have provided suitable indicating mechanism, to show at all times, the position of a given roll stand in the forming line, and to indicate adjustment of the roll stand in the forming line. Referring to Figs. 1, 15, 16 and 17, it will be noted that the pedestal P¹ is provided with an upwardly extending rod 142. Connected with this rod is a flexible wire 144 which passes over fixed pulleys 146 located at suitable points in the plant, and connects with an indicating means I located at the control station. The indicating means may comprise a drum 148 with indicia on its periphery, this drum being fixed to a spool 150 around which the end of the wire 144 is wound, the end of the wire being attached to the face of the drum as at 152. The drum rotates around a shaft 154 which is carried on a suitable frame 156, and turning movement of the drum and the spool 150 is resisted by a spring 158 which is secured at one end to the spool, and fixed at its opposite end to the shaft 150. When the roll stand is moved inwardly from the loading point to the forming line, the drum 148 is turned on the shaft 154 to indicate the distance that the roll stand has travelled on the track, and each roll stand can, therefore, be properly positioned in the forming line, with due regard to the length of the roll which it carries, by manipulating the electrical starting and stopping mechanism from the central control point. Furthermore, during operation of the forming mechanism, when it is observed that the paper from one roll is slightly out of alignment, the fault may be corrected by returning to the control point, and moving the particular roll stand to the right or left, the necessary number of inches or fractions thereof, in order to place it in proper alignment. The drum 148 will carry indicia down to fractions of inches, in order to permit a minute adjustment of the roll stand in the forming line.

The operation of the roll stand of the present invention will be understood from the above description. From a remote control point in the plant, any given roll stand may be caused to move outwardly from the forming line to a loading point, which may be in the aisle adjacent the forming line or at some other location convenient to the place where the rolls are stored. It is only necessary to convey the rolls to the loading point, by means of a conventional lift truck, and the rolls are lifted on this truck and held in proper position between the chucks of the mobile roll stand, as described. The attendant at the particular stand may manipulate the push button switches on the roll stand, to cause the pedestals to separate for the insertion of the roll between them, and to cause them to move toward one another to grip the roll. It will be evident from the above description, that the roll stand is of simple and rugged construction, and the working parts are few in number. The pedestals are guided in their movement toward one another on the bars B, which are angularly arranged as shown in Fig. 1, with respect to the vertical, to provide maximum resistance against bending movement.

When the roll has been mounted, proper buttons are pushed at the control point to cause the roll stand to move inwardly to position in the forming line, the necessary movement being shown on the indicator I at the control point. The roll stand may be caused to move back and forth in the forming line, as necessary, to properly position and maintain the roll in the forming line.

The inner face of the disc 10 may be slightly tapered as indicated in Fig. 6, to frictionally engage the roll as the size of the roll is reduced. The adjusted pressure of the brake shoes 20 may be reduced by turning the control screws 24 on the opposed pedestals, when the major part of the roll has been unwound.

An indicator would be provided for each roll stand at the control point, whereby each roll stand is under control, as far as its position is concerned, from a central point.

I claim:

1. A mobile sheet roll stand comprising a pair of independent pedestals each having track engaging wheels for moving the stand into a sheet forming line and roll engaging chucks, a lead screw fixed to one of said pedestals and extending through the other pedestal, said other pedestal having a driving nut mounted for rotation therein surrounding said screw, thrust bearings at the ends of said nut, a motor mounted on said other of said pedestals having driving connections to said nut whereby to adjust the relative positions of said pedestals and their chucks with respect to one another, and a motor on one of said pedestals and driving connections to its wheels for moving the stand as a unit into and from the sheet forming line.

2. A mobile sheet roll stand comprising first and second adjustably connected pedestals having track engaging wheels for moving the stand into a forming line, a lead screw connecting said pedestals, driven means on said second pedestal engaging said screw for relatively adjusting said second pedestal on the track from and toward said first pedestal to grip and release a roll, bearing blocks mounted at the upper ends of said pedestals, core plugs adapted to enter opposite ends of the roll opening rotatably mounted in said bearing blocks, and means for mounting said bearing blocks on their pedestals for limited pivotal movement about horizontal axes normal to the roll axis providing self-alignment of said core plugs when a roll is gripped and supported thereby.

3. A construction in accordance with claim 2, including a motor and driving connections mounted on the first pedestal for driving its wheels to move the support as a unit along the track.

4. A construction in accordance with claim 2, including brake drums and manually adjustable brake shoes operatively engaged with said core plugs on each of said pedestals to control the turning movement of the roll when the sheet is being pulled through the forming line.

5. A construction in accordance with claim 2, including yielding stops mounted on each of said pedestals positioned to engage said bearing blocks to cushion their pivotal movement when a roll is gripped between the pedestals.

6. A construction in accordance with claim 2, including a motor and driving connections mounted on said first pedestal for driving its wheels to move the support as a unit along the track, and indicating means connected with one of said pedestals and responsive to movement of the stand along the track to indicate the position of the stand in the forming line.

7. A construction in accordance with claim 2, including longitudinally extending guide bars fixed at one end to said first pedestal and extending through said second pedestal, said second pedestal having guiding openings therein to slidably receive said bars.

8. A construction in accordance with claim 2, wherein said pedestals comprise frame members which are offset from the longitudinal center line of the stand in a direction opposite to that of the movement of the sheet through the forming line.

9. A sheet roll stand comprising a pair of pedestals and connecting means for adjusting said pedestals relatively from and toward one another to receive and grip a heavy roll of sheet material, bearing blocks at the upper ends of said pedestals, core plugs adapted to enter opposite ends of the roll opening rotatably mounted in said bearing blocks, and trunnions extending transversely from said bearing blocks and mounted on said pedestals for limited pivotal movement about horizontal axes normal to the roll axis providing self-alignment of said core plugs when a roll is gripped and supported thereby.

10. A construction in accordance with claim 9, including yielding stops mounted on each of said pedestals positioned to engage said bearing blocks to cushion their pivotal movement when a roll is gripped between the pedestals.

References Cited in the file of this patent

UNITED STATES PATENTS

| | | |
|---|---|---|
| 1,788,648 | Wood | Jan. 13, 1931 |
| 1,869,545 | Crafts | Aug. 2, 1932 |
| 2,075,192 | George | Mar. 30, 1937 |
| 2,139,873 | Yoder | Dec. 13, 1938 |
| 2,288,350 | Gollwitzer | June 30, 1942 |
| 2,293,732 | Guttmann | Aug. 25, 1942 |
| 2,490,685 | Greene | Dec. 6, 1949 |